United States Patent [19] [11] 4,026,761
Vargiu et al. [45] May 31, 1977

[54] PROCESS FOR THE PREPARATION OF DIEPOXIDES

[75] Inventors: Silvio Vargiu, Casatenovo, (Como); Giancarlo Crespolini, Bergamo; Giulio Grazzini, Milan, all of Italy

[73] Assignee: Societa' Italiana Resine S.I.R. S.p.A., Milan, Italy

[22] Filed: July 8, 1976

[21] Appl. No.: 703,343

[30] Foreign Application Priority Data

July 8, 1975 Italy .................. 25176/75

[52] U.S. Cl. .................... 159/49; 159/DIG. 8; 159/DIG. 15; 159/DIG. 16; 203/91
[51] Int. Cl.² ............................ B01D 1/22
[58] Field of Search .............. 203/72, 80, 89, 91; 159/49, 47 R, DIG. 8, DIG. 10, DIG. 15, DIG. 16

[56] References Cited

UNITED STATES PATENTS

| | | |
|---|---|---|
| 3,410,761 | 11/1968 | Slattery .................. 203/80 |
| 3,892,634 | 7/1975 | Hajek .................. 203/72 |

Primary Examiner—Hiram H. Bernstein
Attorney, Agent, or Firm—Sughrue, Rothwell, Mion, Zinn & Macpeak

[57] ABSTRACT

Diepoxides of the general formula:

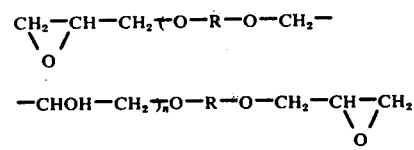

wherein $n$ has an average value not exceeding 0.03 and R is the bisphenyl radical of bisphenol-A are recovered from an epoxy resin of the same general formula with $n$ varying from 0.07 to 0.30, by removing the low-boiling substance from the epoxy resin at 0.1–1 mm Hg and 165°–200° C and distilling off said diepoxide from the thus treated epoxy resin at 0.1–0.005 mm Hg and a temperature not exceeding 240° C. The low viscosity, narrow molecular weight distribution and excellent purity of these diepoxides allow their use in critical application fields.

9 Claims, 1 Drawing Figure

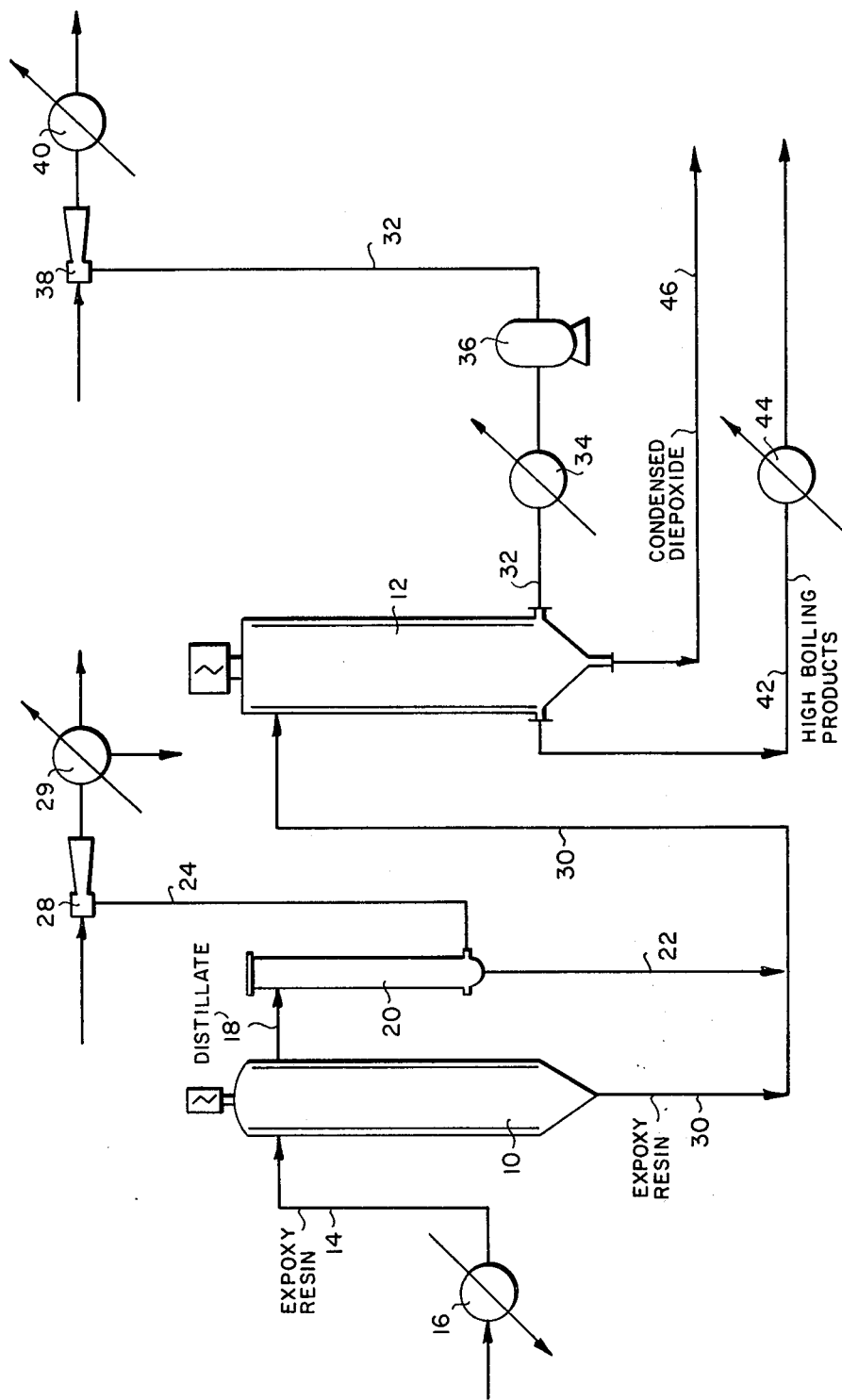

PROCESS FOR THE PREPARATION OF DIEPOXIDES

The present invention relates to a process for recovering pure diepoxides having low molecular weights and viscosities, from epoxy resins having medium or high values of the viscosity.

In the present specification, by epoxy resins having a medium or high viscosity, or merely by epoxy resins, will be intended the condensation products of bisphenol-A and epichlorohydrin, defined by means of the general formula:

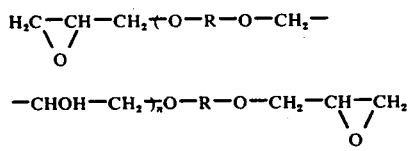

$$H_2C-CH-CH_2\text{-}(O-R-O-CH_2-CHOH-CH_2)_n\text{-}O-R-O-CH_2-CH-CH_2 \quad (I)$$

wherein $n$ has an average value of from 0.07 to 0.30 and R is the radical of bisphenol-A (HO — R — OH).

Moreover, by diepoxides having low molecular weight and viscosity values, or merely by diepoxides, will be intended the products defined by means or formula (I), wherein $n$ is zero or has an average value very near to zero, up to a maximum of 0.03.

Epoxy resins are valuable products which find a number of applications in the art.

For example, they are used in the field of paints and coatings in general, or else in the field of adhesives and binders (cement and bitumen pavements).

These resins are also used in the electronics field (casting, printed circuits, sealing and encapsulation of electrical components) as well as in a number of other fields.

The production of epoxy resins from bisphenol-A and epichlorohydrin is known in the art and may be carried out by means of a continuous or discontinuous process, in the presence of alkali metal hydroxide in an amount of 2 moles or about 2 moles, for each mole of bisphenol-A.

The discontinuous process is usually carried out by feeding a concentrated aqueous solution of alkali metal hydroxide to a solution of bisphenol-A in epichlorohydrin.

The reaction is carried out at atmospheric pressure, or at a pressure slightly lower than atmospheric, controlling the temperature in such a manner as to continuously distil off the water introduced together with the alkali metal hydroxide, in the form of an azeotrope with epichlorohydrin.

Upon completion of the addition of the alkali metal hydroxide solution, all the residual water is removed, the unreacted epichlorohydrin is recovered by distillation at subatmospheric pressure and the alkali metal chloride, by-product of the reaction, is removed by dissolving it in water.

Epoxy resins are also prepared in the known art by means of a continuous technique, reacting bisphenol-A and epichlorohydrin in a plurality of reactors arranged in series. More particularly, bisphenol-A and epichlorohydrin are continuously fed into the first of said reactors, whereas aqueous alkali metal hydroxide is fed into each of said reactors up to a maximum amount equal to, or about equal to, 2 moles for each mole of bisphenol-A.

The reaction products continuously discharged from the last reactor are decanted to separate the liquid epoxy resin from the water and from the alkali metal chloride obtained as a by-product of the reaction.

A peculiarity of these known processes consists in that the reaction is carried out in the presence of oxygen-containing organic substances usually of the alcohol or ketone type.

As is known, in the synthesis of epoxy resins from bisphenol-A and epichlorohydrin, it is difficult to obtain products having a low molecular weight, corresponding to formula (I) with $n$ equal to zero or at least near to zero.

In particular, the commercial epoxy resins obtained by reacting bisphenol-A and epichlorohydrin are usually liquid under ambient conditions and have an average value of $n$ of from about 0.15 to about 0.30.

These resins have moreover an epoxy equivalent value (grams of resin which contain one epoxy group) of from 190 to 210 and a viscosity at 25° C of from about 10,000 to about 40,000 cps.

A typical molecular weight distribution of said epoxy resins is as follows:

80–86% with a molecular weight of 340 ($n = 0$)
14–11% with a molecular weight of 624 ($n = 1$)
6–3% with a molecular weight of 908 ($n = 2$).

Attempts have been made in the art to reduce the value of $n$ by means of various expedients, such as for example by maintaining high values of the molar ratio between epichlorohydrin and bisphenol-A, or else, in the continuous processes, by dividing the alkali metal hydroxide amongst the different reaction steps and by adding alcohols or ketones to the reaction medium.

These expedients have not given completely satisfactory results with regard to the molecular weight and the viscosity of the epoxy resins.

It has not been possible in practice to lower the epoxy equivalent below about 180 ($n = 0.07$ in formula (I)) and the viscosity below 7,000 cps (25° C).

These epoxy resins moreover contain various impurities, especially unreacted monomers, monoepoxides, polyepichlorohydrins, in addition to those deriving from the utilization in the synthesis, of organic substances different from the reagents proper.

A need was thus felt for obtaining epoxy resins endowed with a high purity and having a molecular weight distribution as narrow as possible, in addition to a low viscosity.

A narrow distribution of the molecular weight and a low viscosity are desirable since the compositions containing epoxy resins with these characteristics are the best suited for the major part of the applications, especially those in which one uses inert fillers.

On the other hand epoxy resins free, or substantially free, from the impurities previously alluded to, permit the obtaining of manufactured products having suitable characteristics even in the most critical applications, such as for example, in the electronics field.

It has now been found that it is possible to treat the epoxy resins having medium or high viscosities to separate a diepoxide having an extremely high purity, a low viscosity, and corresponding to a structural formula (I) is which $n$ is zero or has an average value near to zero, up to a maximum of 0.03.

Thus, the invention provides a process for recovering a diepoxide having a viscosity of from 3,000 to 4,600 cps at 25° C, defined by means of the formula:

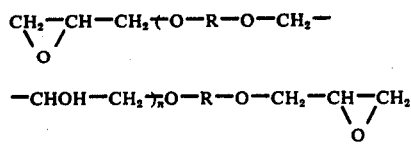

wherein R is the bisphenyl radical of bisphenol-A (HO—R—OH) and n has an average value not exceeding 0.03, from a liquid epoxy resin having a viscosity of from 7,000 to 40,000 cps at 25° C, defined by means of formula (I) wherein n has an average value of from 0.07 to 0.30, characterized by removing in a first evaporation step the low-boiling substances from said epoxy resin at a pressure of from 0.1 to 1 mm Hg and at a temperature of from 165° to 200° C, and distilling off said diepoxide from the thus treated epoxy resin, in a second evaporation step, at a pressure of from 0.1 to 0.005 mmHg and at a temperature not exceeding 240° C, the overall residence time of said epoxy resin in said first and second evaporation steps not exceeding about 100 seconds.

The present invention will now be more fully described, by way of example only, with reference to the accompanying drawing, which illustrates an apparatus for carrying out an embodiment of the invention.

The epoxy resins usually treated according to the process of the present invention are commercial epoxy resins, corresponding to the general formula (I) with $n$ varying from about 0.15 to about 0.30 and having an epoxy equivalent of from 190 to 210 and a viscosity at 25° C of from about 10,000 to about 40,000 cps.

According to the process of the invention, the epoxy resins are freed in the first evaporation step from dissolved gases (more particularly oxygen, carbon dioxide and nitrogen) and from low-boiling products (such as epichlorohydrin and the organic substances used in the synthesis stage and the separation stage of the epoxy resins).

The first evaporation step is conveniently carried out in an apparatus permitting a low residence time under the evaporation conditions to be maintained, especially in thin falling film evaporators of the static or dynamic type.

In particular, operating under the conditions previously described, an amount of distillate of from 0.5 to 1.5% by weight with respect to the epoxy resin fed in is generally vaporized and the condensable fraction is conveniently recovered from the distillate by cooling at a temperature close to 0° C.

The second evaporation step is conveniently carried out in a guided rotating film evaporated with internal condensation, which permits extremely short residence times to be obtained under the evaporation conditions.

The operation temperature in said second step must not exceed 240° C and it is generally not convenient to lower the temperature below 180° C.

The amount of recovered diepoxide obviously depends on the molecular distribution of the epoxy resin under treatment and the value of n which is desired in said diepoxide and generally ranges from 60 to 85% by weight with respect to the feed to the second evaporation step.

In any case, the evaporation times in the first and second steps, or better, the overall residence time of the epoxy resin under the evaporation conditions, are critical.

As indicated above, said residence time must be lower than 100 sec. and the evaporation time is generally maintained at from 30 to 60 seconds in the first step and from 20 to 40 seconds in the second step.

Thus, the process of the present invention comprises a first evaporation treatment for the purpose of the removal from the epoxy resin of the gaseous products and the low-boiling products which are always present in the epoxy resins, through in low amounts, as by products of the synthesis or as residue of the solvents or diluents used in said synthesis or in the separation and washing steps of the resin.

This first evaporation step is essential for the purposes of the present invention to ensure in the subsequent evaporation step the vapour pressure conditions suitable for the evaporation of the diepoxide.

This latter evaporation should moreover be carried out in an apparatus allowing high heat-exchange coefficients, very short residence times and relatively low evaporation temperatures under the operation pressure, thereby to permit a molecular distillation of the product.

In any case, operating under the described conditions, one primarily avoids the polymerization phenomena which would lead to an increase in viscosity of the bottom products and accordingly to a loss in useful product. The side reactions of aperture of the epoxy bridge, which would lead to a decrease in purity of the diepoxide and thus to a decrease of the technological value of said diepoxide, are also avoided.

Finally, operating according to the process of the present invention, one avoids the thermal scission reactions which would give rise to products of such structures as to adversely affect the properties of the corresponding cross-linked epoxy compositions.

More particularly, the diepoxide obtained according to the process of the invention has typically a molecular weight equal to or very near to 340, an epoxy equivalent of 170 or very close to this value and a viscosity at 25° C of 3000–4600 cps, in addition to very high purity.

In practice, the average n value of the diepoxide is from 0 to 0.03 and usually from 0 to 0.01, and in this last case the viscosity is of the order of 3000–3800 cps at 25° C.

In the following experimental examples, the apparatus schematized in the drawing has been used.

More particularly, with reference to said drawing the epoxy resin is fed to evaporator 10 through pipe 14, after pre-heating in exchanger 16.

Evaporator 10 is a commercial thin falling film evaporator of the dynamic type.

The distillate is removed through pipe 18, cooled in surface exchanger 20 and finally recovered through pipe 22. Exchanger 20 is connected through vacuum pipe 24 to ejector 28 in turn connected to exchanger 29.

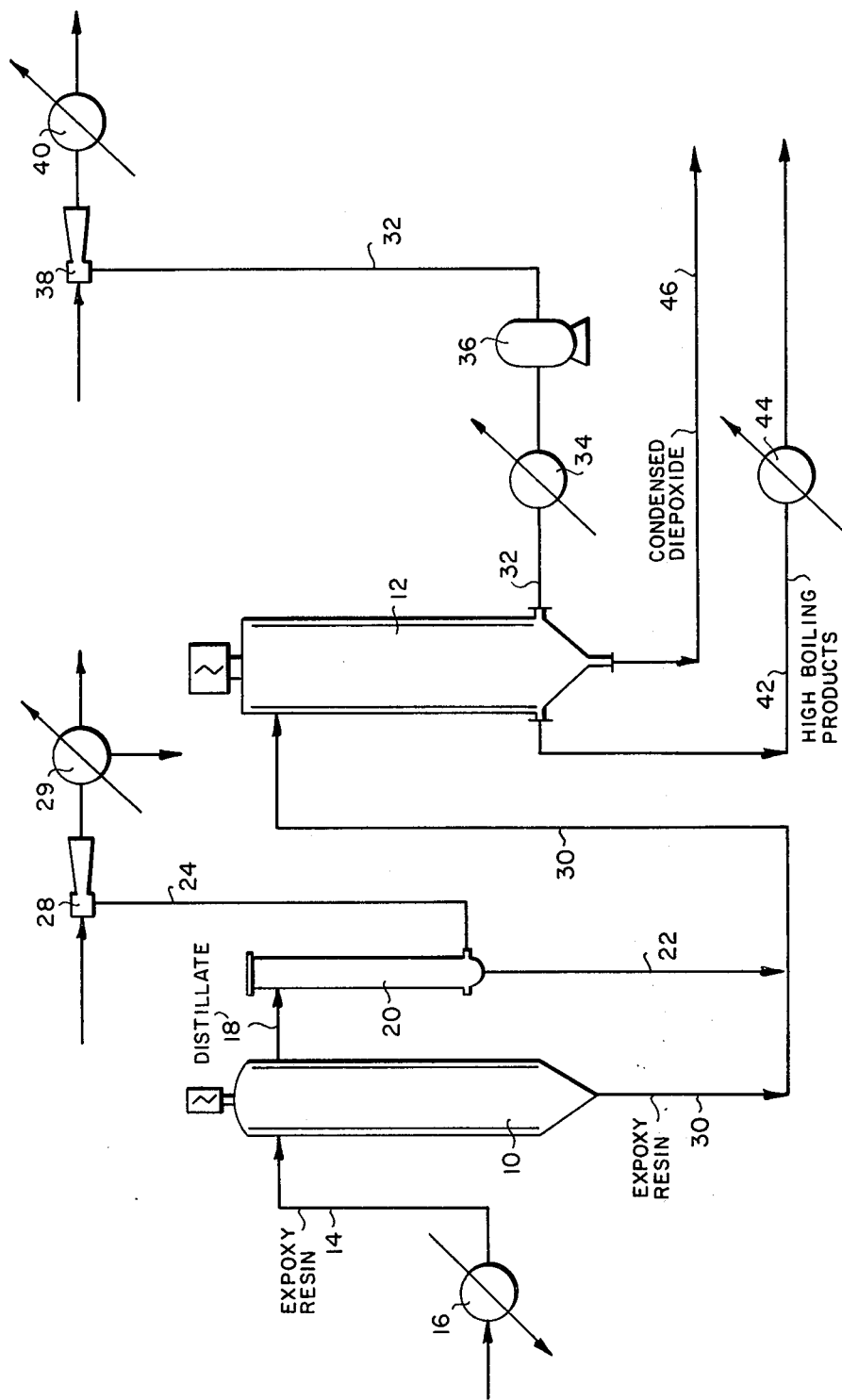

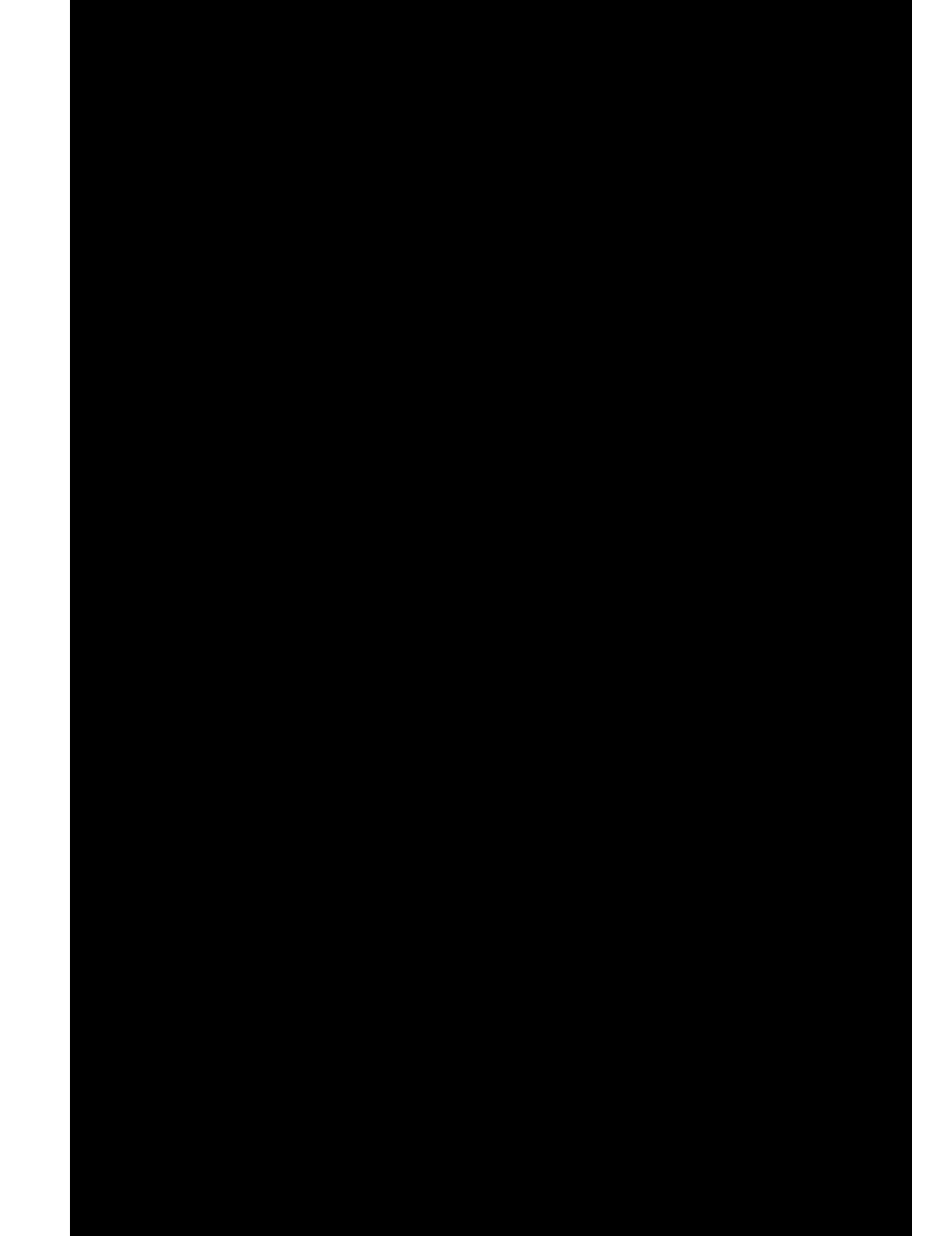

The epoxy resin freed from low-boiling products is discharged through pipe 30 and fed to evaporator 12 of the guided rotating film type, commercialized under the name ROTAFILM LH130 by the Carl-Canzler Society (Düren). Evaporator 12 is of the internal condensation type and the condensed diepoxide is discharged through pipe 46. The high-boiling products obtained as the evaporation residue are recovered through pipe 42 after cooling in exchanger 44. Evapo-